(12) United States Patent
Kent

(10) Patent No.: US 10,104,998 B2
(45) Date of Patent: Oct. 23, 2018

(54) PEELER

(71) Applicant: Progressive International Corporation, Kent, WA (US)

(72) Inventor: Joseph Kent, Seattle, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 396 days.

(21) Appl. No.: 14/824,479

(22) Filed: Aug. 12, 2015

(65) Prior Publication Data

US 2016/0066735 A1 Mar. 10, 2016

Related U.S. Application Data

(60) Provisional application No. 62/046,581, filed on Sep. 5, 2014.

(51) Int. Cl.
*A47J 17/02* (2006.01)

(52) U.S. Cl.
CPC ..................... *A47J 17/02* (2013.01)

(58) Field of Classification Search
CPC ....................................... A47J 17/02
USPC ................................ 30/279.6, 279, 280, 340
See application file for complete search history.

(56) References Cited

U.S. PATENT DOCUMENTS

| | | | | | |
|---|---|---|---|---|---|
| 2,232,940 | A | * | 2/1941 | Fender | A47J 17/02 30/278 |
| 2,362,896 | A | * | 11/1944 | Gamache | A47J 17/02 30/279.6 |
| 3,591,923 | A | * | 7/1971 | Rose | A47J 17/02 30/279.4 |
| 3,921,289 | A | * | 11/1975 | Hasegawa | B25G 3/18 30/338 |
| 3,956,825 | A | * | 5/1976 | Ness | A47J 17/02 30/279.6 |

\* cited by examiner

*Primary Examiner* — Omar Flores Sanchez

(74) *Attorney, Agent, or Firm* — Lowe Graham Jones PLLC

(57) ABSTRACT

A peeler, preferably for fruits and vegetables, includes a handle and a blade attached to the handle for pivotal movement about a long axis extending from the handle through the blade. A knob is attached to the blade and is grippable by a user to control the pivotal movement of the blade with respect to the handle.

16 Claims, 4 Drawing Sheets

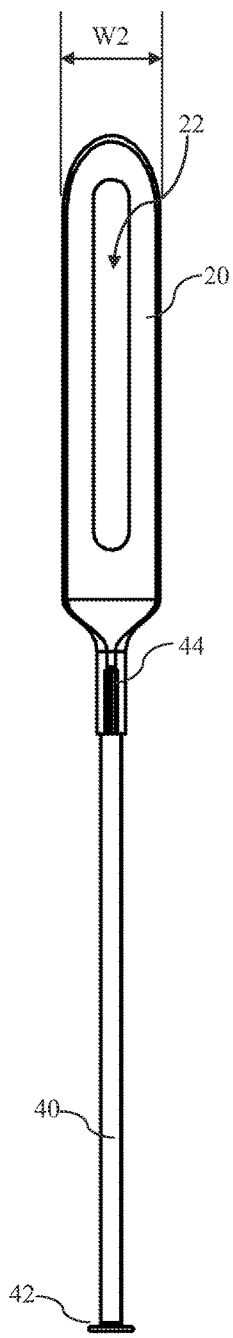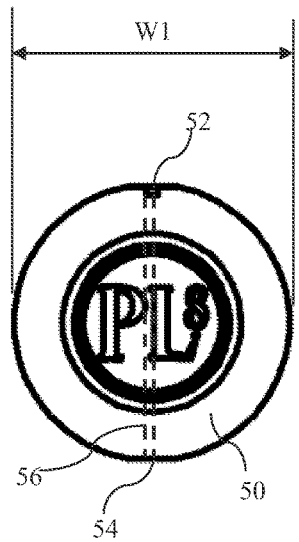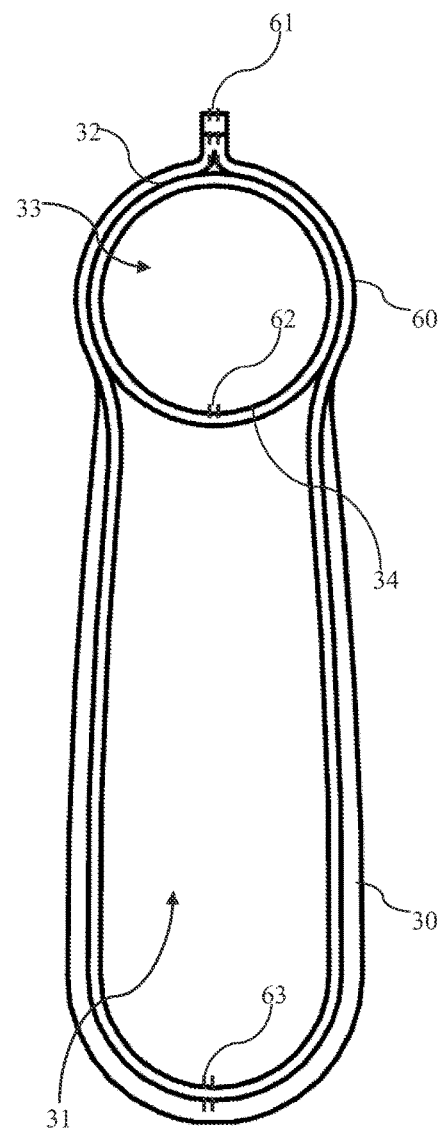
Figure 7
Figure 8
Figure 9

PEELER

PRIORITY CLAIM

This application claims the benefit of prior U.S. provisional application No. 62/046,581, filed Sep. 5, 2014, the contents of which are hereby incorporated by reference.

FIELD OF THE INVENTION

The present invention relates generally to peelers, particularly including vegetable peelers.

BACKGROUND OF THE INVENTION

Vegetable peelers are often constructed in a manner in which a peeling blade connected to a pivoting rod is supported within a handle. The blade is typically constrained to allow for a limited range of pivotal movement. Although constrained, there is no easy way for a user to control the pivoting of the blade or to hold the blade in a fixed position if desired. In some instances a user may position the user's thumb against a portion of the blade in order to control movement, but this manner of operation increases the probability that the user may get cut by the blade.

SUMMARY OF THE INVENTION

A peeler, preferably for fruits and vegetables, includes a handle and a blade attached to the handle for pivotal movement about a long axis extending from the handle through the blade. A knob is attached to the blade and is grippable by a user to control the pivotal movement of the blade with respect to the handle.

In one version of the invention, the blade is carried on a rod which extends through the length of the handle. In a preferred example, the knob is attached to the blade at a juncture where the blade is mounted to the knob.

In some versions the knob is rounded and includes at least e substantially planar surface, preferably located where it may be gripped by a thumb of a user during use.

In an example of the invention, the knob extends beyond the depth of the handle so that it may more readily be engaged by the user.

In one version, the knob is trapped within a housing formed in the handle.

BRIEF DESCRIPTION OF THE DRAWINGS

Preferred and alternative examples of the present invention are described in detail below with reference to the following drawings.

FIG. 7 is a front plan of a preferred peeler blade.
FIG. 8 is a front plan view of a preferred peeler knob.
FIG. 9 is a front plan view of a preferred peeler handle.

DETAILED DESCRIPTION OF THE PREFERRED EMBODIMENT

Figure 1:
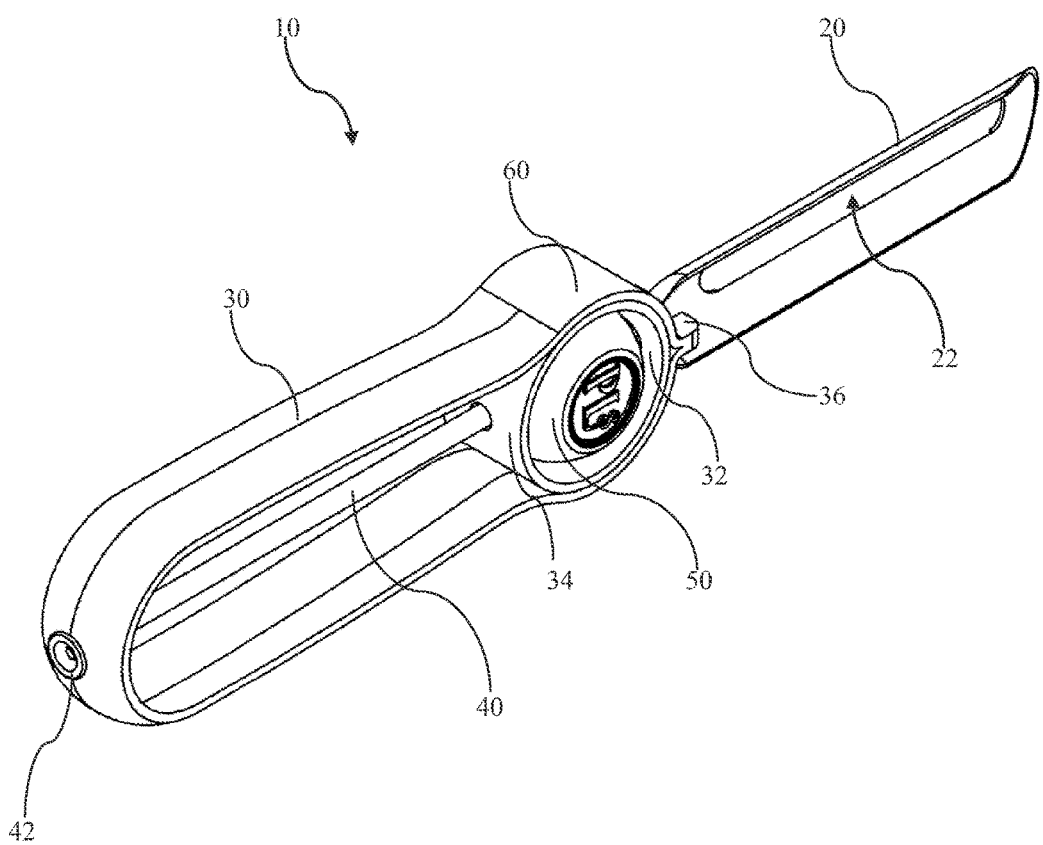
FIG. 1 is a perspective view of a preferred peeler.

A preferred peeler 10 is shown fully assembled in FIGS. 1-6, and disassembled into its primary components in FIGS. 7-9. With reference to FIG. 1, the illustrated version includes a handle 30 supporting a rod 40 connected to a blade 20. The blade preferably is a peeler blade of the type having an opening 22 bounded by a sharpened edge.

A knob 50 is attached to the rod generally at the juncture between the rod and the blade. The knob is preferably seated within a housing 60 formed in the handle to further restrict axial movement of the rod and the blade by trapping the knob 50 within the housing 60.

In a preferred example, the handle 30 is configured as a frame formed from metal such as stainless steel and having an open center area 31, as best seen in the disassembled view of FIG. 9, although in other versions the handle may be formed from different materials or may be solid or otherwise have a filled-in interior. The preferred handle further includes a housing 60 having an open area 33 formed at the proximal end of the handle. In the illustrated example, the open area 33 is generally circular or cylindrical in shape and bounded by a sidewall that includes a proximal portion 32 and a distal portion 34.

The blade 20 is formed from stainless steel, plastic, or other suitable materials. As noted above, in one example, the blade includes an elongated central opening 22 having an inward-facing sharpened edge. The blade may be formed with an edge that is straight, serrated, scalloped, or otherwise configured to produce a desired cut. Likewise, there need not be a blade formed with an elongated central opening, but rather the sharpened edge may simply be formed on any side or end of the blade.

Figure 2:
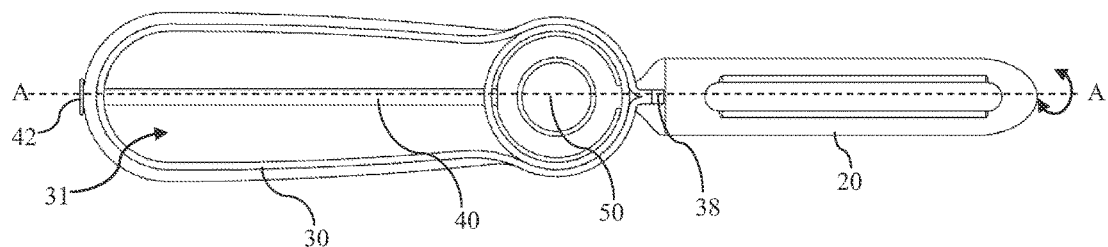
FIG. 2 is a back view of a preferred peeler.
Figure 3:
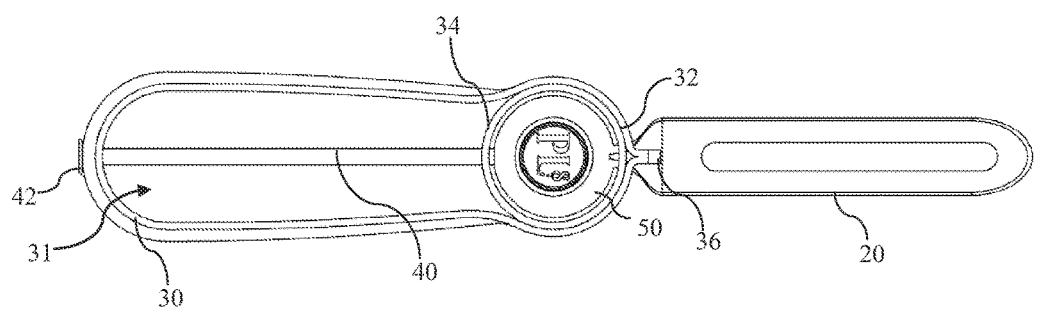
FIG. 3 is a front view of a preferred peeler.

With reference to FIG. 2, the blade 20 is preferably attached to the proximal end of the handle, and extends axially away from the handle along an axis A-A defined by the handle 30 and the rod 40. As illustrated, the blade 20 is attached for pivotal movement about the axis, such as indicated in the arrows shown in FIG. 2.

The blade 20 and rod 40 may be integrally formed with one another, or may be configured as separate components that are attached to one another. In one example, one end of the blade is formed with a slot 44 shaped to receive one end of the rod 40, and then the slot is crimped onto the rod in order to attach the blade to the rod. In such an example, the blade may be formed with wings that are bent toward one another to form the slot at the neck of the blade. The blade may alternatively be attached to the rod by mating threads, or it may be soldered, welded, glued or otherwise attached to the rod.

The second end of the rod, opposite the attachment of the blade, includes a flange 42 that serves as a stop to retain the rod in position in the handle. Most preferably, the flange is circular in shape and is configured to seat within a recess formed in the handle.

As best seen in FIG. 8, the knob 50 is formed with a central bore 56 that extends between a first end 52 and a second end 54 running axially through the center of the knob. When fully assembled, the rod 40 is seated within and extends through the central bore so that the knob surrounds the juncture of the rod and the flange that forms the neck 44 of the blade. Alternatively, the knob 50 is over-molded onto the rod and the neck of the blade, avoiding the necessity of forming a knob and central bore and then attaching it in separate steps.

The first end of the rod 40 adjacent the flange 42 is received within a hole 63 (see FIG. 9) formed in a first, or distal, end of the handle. Preferably the rod is seated within the hole formed in the handle in a manner that allows for pivotal movement of the rod (about an axis defined by the elongated rod itself) within the handle. The opposite second end of the rod is received within a hole 61 formed in the second, or proximal, end of the handle. Likewise, an intermediate portion of the rod is received within yet another hole 62 formed within the sidewall 34 that surrounds the knob. In each case, the rod is received for pivotal movement. Thus, the three holes 61, 62, 63 are axially aligned with one another, and the rod 40 is received within all three holes so that the rod can rotate within the holes.

The handle 30 preferably further includes an upper projection 36 and a lower projection 38 extending axially outward from the handle toward the distal end of the blade. The upper and lower handle projections are slightly separated from the upper and lower surfaces of the blade 20 during normal use. When the blade rotates through pivotal movement in either direction, the upper and lower surfaces of the blade will contact the upper and lower projections in order to restrict the degree of pivotal movement to a range defined by the size and positions of the projections.

Figure 4:
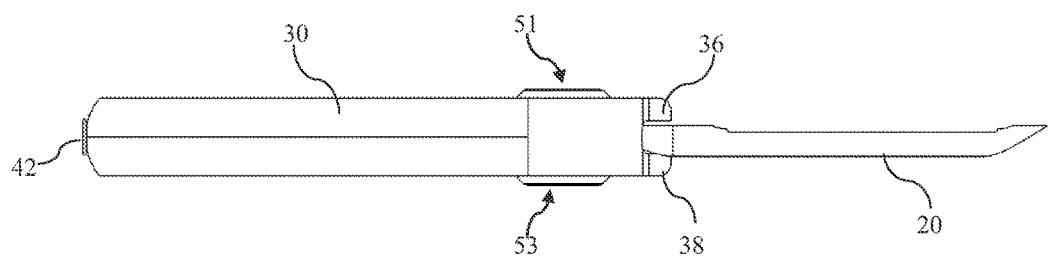
FIG. 4 is a top view of a preferred peeler.
Figure 5:
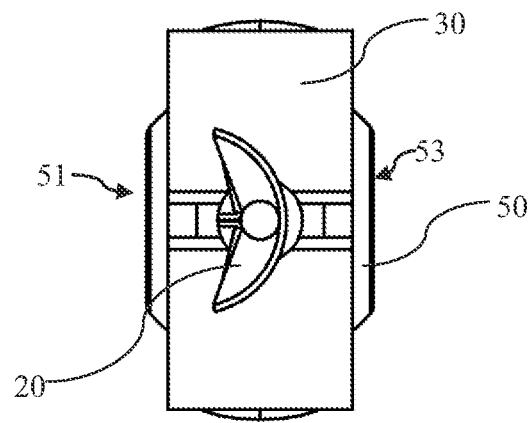
FIG. 5 is a right side view of a preferred peeler.
Figure 6:
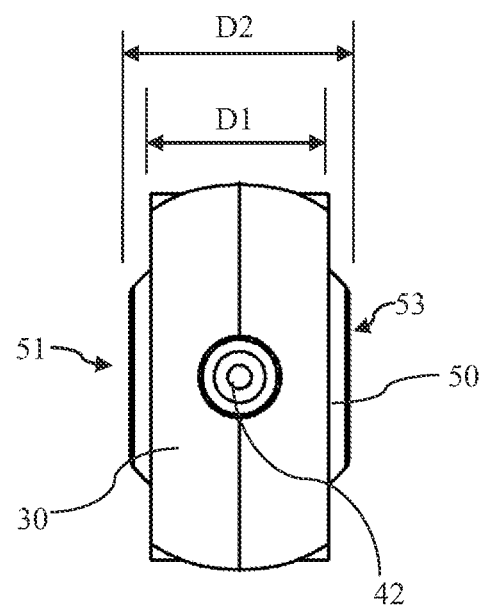
FIG. 6 is a left side view of a preferred peeler.

In the illustrated example, the knob 50 is formed substantially in a barrel shape, having generally planar upper and lower surfaces 51, 53 (see FIG. 4). The upper and lower planar surfaces define the top end bottom ends of a slightly bulged cylinder. Alternatively, the knob 50 may be formed as a sphere having flattened top and bottom ends, as a straight sided cylinder, as a sphere without flattened ends, or in other shapes. The incorporation of the flattened upper and lower surfaces 51, 53 is preferred because it provides an enhanced surface area for a user to grip the knob in order to control pivotal movement of the blade. As best seen in FIGS. 4-6, most preferably the knob 50 extends slightly above and below the edges of the handle 30. In other words, the flattened upper surface 51 and the flattened lower surface 53 each extend beyond the upper and lower surfaces of the handle. As seen in FIG. 6, for example, the knob 50 has a depth D2 between the upper and lower surfaces 51, 53, while the handle 30 has a depth of D1. The depth D2 is preferably greater than D1, and in the illustrated example the knob extends beyond the depth of the handle by a substantially equal amount on each side. Most preferably, the amount of the extension beyond the handle is minimal, and in one example is one quarter inch or less. In other versions, D1 equals D2. This small amount of extension of the knob beyond the boundary of the handle allows a user to readily grip the knob with a forefinger and thumb during use in order to direct or restrict pivotal movement of the blade as may be desired.

The knob is also preferably wide enough to be engaged by the thumb of the user in a manner that enables the user to control the pivoting action of the blade by force applied to the knob. With reference to FIG. 8, the knob is formed with a width W1, which is preferably at least one half inch and more preferably about one inch. With reference to FIG. 7, the blade is also formed with a width W2, which is narrower than the width of the knob in a preferred version.

In use, a user grips the handle, including the knob 50. The pivoting nature of the rod 40 within the handle 30 allows the user to control the angular position of the rod within the handle, and therefore the blade position with respect to the handle. The user is then able to peel a vegetable or other item with the blade oriented in a preferred position while also retaining the blade in that position during use by holding the position of the knob. The user may also release the knob to allow the blade to freely pivot as desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A peeler, comprising:
   a handle having a distal end and a proximal end and defining a handle axis, the handle further having a front side and a back side and defining a housing;
   a peeler blade having an elongated central opening and an inward-facing sharpened edge, the blade being attached to and extending away from the proximal end of the handle along the handle axis, the blade further being attached for pivotal movement of the blade about the handle axis; and
   a knob attached to the blade at the proximal end of the handle, the knob being carried on the handle and mounted within the housing for rotational movement of the knob together with the blade about the handle axis;
   the knob further having a flattened surface facing the front side of the handle, whereby the flattened surface may be engaged by a thumb of a user to restrict rotational movement of the knob and the blade.

2. The peeler of claim 1, wherein the knob is shaped as one of a barrel, a flattened sphere, or a cylinder.

3. The peeler of claim 2, further comprising a rod attached to the blade and mounted on the handle along the handle axis, the knob being attached to the rod.

4. The peeler of claim 3, wherein the handle is formed with a housing defining an open area which is circular or cylindrical in shape and having a diameter which extends along the handle axis, the knob being positioned within the housing.

5. The peeler of claim 2, wherein the blade has a width determined perpendicularly to the handle axis and the knob has a width along a line parallel to the blade width, the knob width being greater than the blade width.

6. The peeler of claim 2, wherein the knob is formed with an upper planar surface and a lower planar surface, with a rounded surface extending between the upper and lower planar surfaces.

7. The peeler of claim 2, wherein the handle has a handle depth extending from the front side to the back side of the handle and the knob has a knob depth, the knob depth being greater than the handle depth.

8. The peeler of claim 2, wherein the knob extends out of the handle and beyond either the front side or the back side.

9. A peeler, comprising:
   a handle having a peripheral frame, a distal end, and a proximal end, the handle further having a housing positioned at the proximal end of the handle;
   a peeler blade having an elongated central opening and an inward-facing sharpened edge, the blade being attached to and extending away from the proximal end of the handle along an axis defined by the handle, the blade further being attached for pivotal movement of the blade about the handle axis;
   a knob mounted within the housing and attached to the blade at the proximal end of the handle, the knob being carried on the handle for rotational movement of the knob together with the blade about the handle axis;
   a rod attached to the blade and supported by the housing, the knob being attached to the rod;
   the handle further having a handle depth between an uppermost and a lowermost surface of the handle, the knob having a knob depth, the knob depth being greater than the handle depth; and the knob further having an upper planar surface extending parallel to the handle axis and a lower planar surface extending parallel to the handle axis, with a rounded surface extending between the upper and lower planar surfaces.

10. The peeler of claim 9, wherein the rod further extends from the proximal end of the handle to the distal end of the handle.

11. The peeler of claim 9, wherein the handle frame defines an open internal area.

12. A peeler, comprising:
   a handle having a distal end and a proximal end;
   a peeler blade attached to and extending away from the proximal end of the handle;
   a knob attached to the blade; and
   a rod connected to the knob and defining an axis along the rod, the rod being attached to the handle to mount the knob to the handle for pivotal movement of the knob with respect to the handle about the axis;
   the knob defining a width transverse to the handle axis, and the rod extending through the knob for a distance substantially equal to the width;
   whereby the blade and the knob are mounted to the handle for pivotal rotation together about the axis.

13. The peeler of claim 12, wherein the knob is attached to the handle within a housing positioned within the handle.

14. The peeler of claim 12, wherein the handle further comprises a peripheral frame and the knob is attached to the handle within the peripheral frame.

15. The peeler of claim 12, wherein the knob is formed in the shape of a barrel.

16. The peeler of claim 12, wherein the knob is formed in the shape of a flattened sphere.

* * * * *